Oct. 31, 1939.   C. D. STEWART   2,177,954
BRAKE MECHANISM
Filed June 24, 1938   3 Sheets-Sheet 2
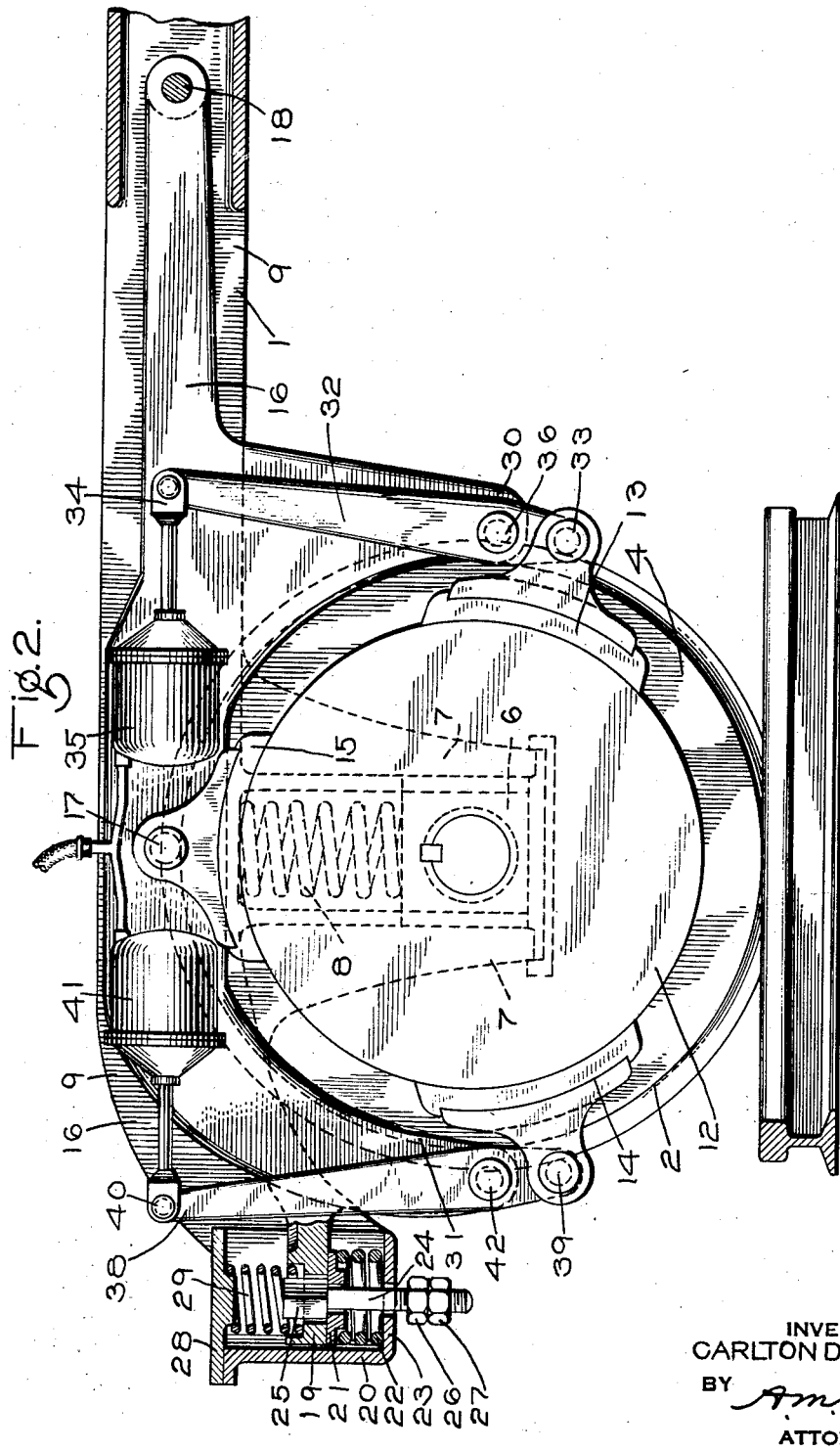
INVENTOR
CARLTON D. STEWART
BY
ATTORNEY

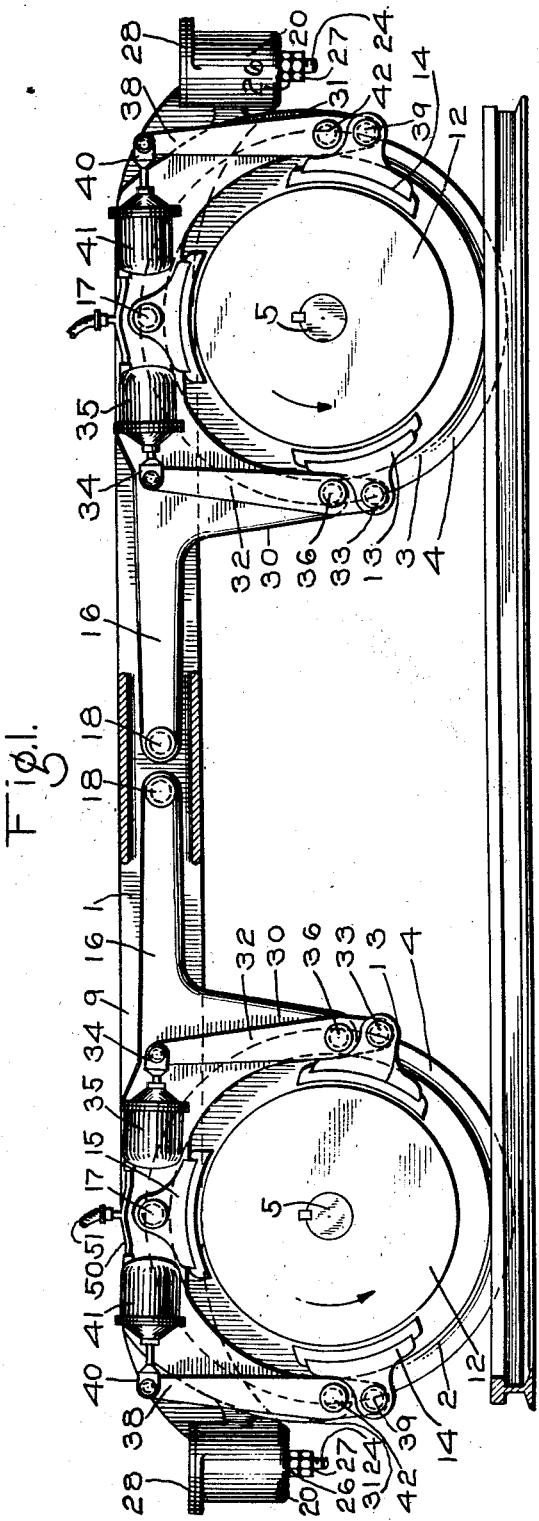

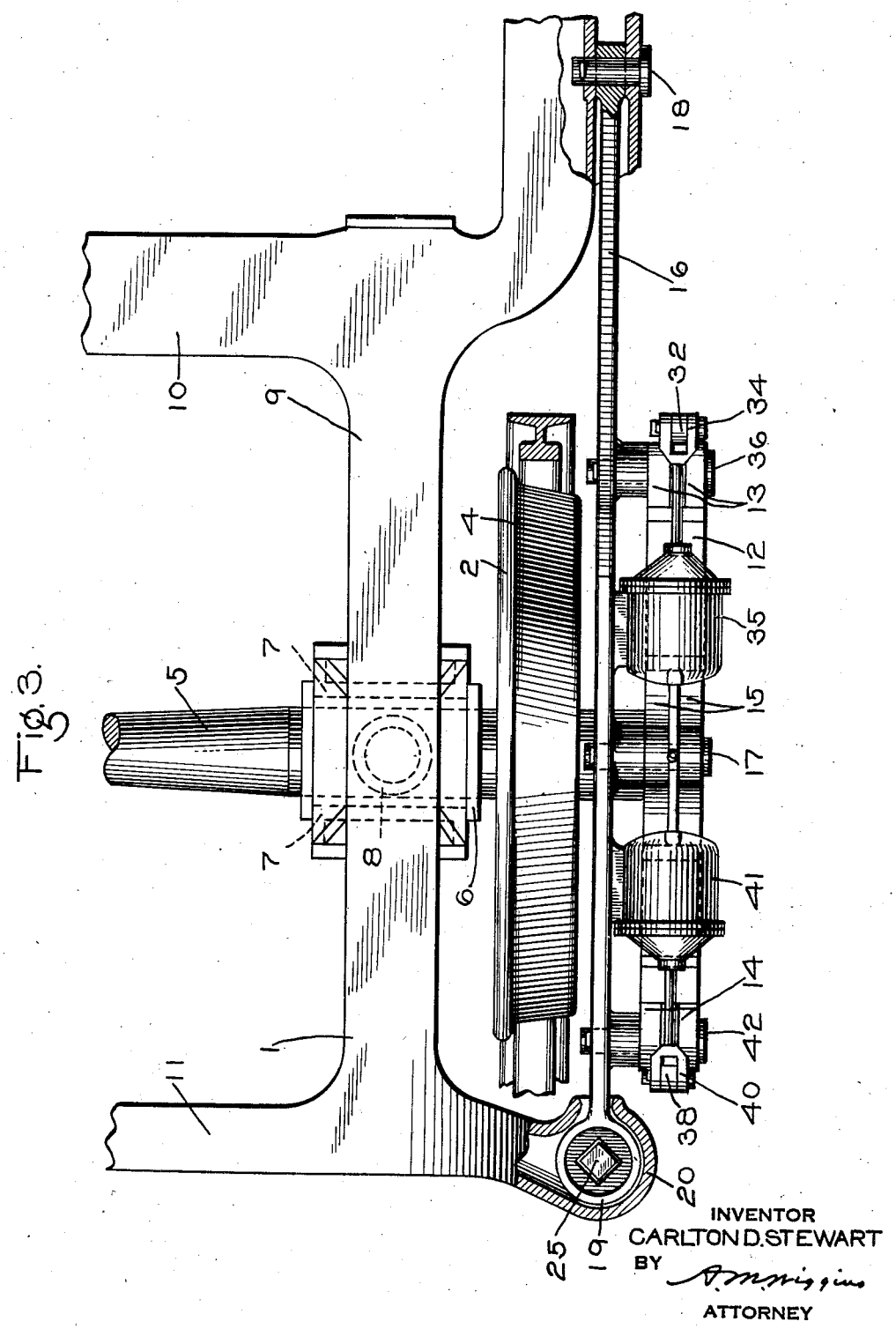

Patented Oct. 31, 1939

2,177,954

UNITED STATES PATENT OFFICE 2,177,954

BRAKE MECHANISM

Carlton D. Stewart, Wilkinsburg, Pa., assignor to The Westinghouse Air Brake Company, Wilmerding, Pa., a corporation of Pennsylvania Application June 24, 1938, Serial No. 215,602

14 Claims. (Cl. 188—58)

This invention relates to brake rigging for railway vehicle trucks and more particularly to that type of brake rigging disclosed in my prior pending application Serial No. 214,517, filed June 18, 1938, in which downwardly directed forces set up in the rigging when the brake shoes are in frictional braking engagement with a wheel and axle assembly will be transmitted to the assemblies instead of to the truck frame, and in which an additional brake shoe or shoes, as the case may be, are adapted to be moved into engagement with the assembly to transmit such force to the assembly and to assist in retarding the assembly.

The brake rigging disclosed in the above-mentioned pending application is of the clasp type and comprises a single brake cylinder and a single system of operatvely connected levers and rods for actuating clasp arranged brake shoes into and out of braking engagement with a wheel and axle assembly of the truck, and further comprises a brake carrier member which normally supports said system from the truck frame and which is actuated by said system when an application of the brakes is initiated to move another brake shoe into engagement with the wheel and axle assembly to assist in retarding the assembly and to support at least the greater portion of the load imposed on the system due to the frictional braking engagement of the clasp arranged brake shoes with the assembly.

An object of the present invention is to provide a novel brake arrangement of the above mentioned type in which each clasp arranged brake shoe or each pair of clasp arranged brake shoes, as the case may be, is operated through the medium of a single brake cylinder carried by the brake carrier. As disclosed in the said copending application, the brake carrier is to be removably carried by the truck frame and responsive to forces set up due to the action of friction between the brake shoes and the wheel and axle assembly to move a third brake shoe, or pair of brake shoes, into frictional engagement with the assembly for assisting in braking the assembly, and for transmitting to the assembly forces set up in the rigging due to the engagement of the clasp arranged brake shoes with the assembly.

According to this object there are two complete brake riggings for each set of clasp arranged brake shoes, which riggings are arranged one on each side of a wheel and axle assembly, and both of which are carried by the movable brake carrier mounted on the truck frame. Both riggings are adapted to actuate the carrier into supporting and braking engagement with the wheel and axle assembly when an application of the brakes is being effected.

This provides a very simple and an inexpensive arrangement which is so compact that it may, as a whole, be disposed outboard of the truck frame and a wheel of the wheel and axle assembly where it will, at all times, be in clear view from the side of the truck for inspection and repair.

Other objects and advantages will appear in the following more detailed description of the invention.

In the drawings Fig. 1 is a side elevational view, partly in section, of a railway vehicle truck embodying the invention, the brake carrier and the several parts of the brake rigging being shown in release position; Fig. 2 is an enlarged side elevational view, partly in section of the same, the brake carrier and the brake rigging being shown in brake applying position; Fig. 3 is a fragmentary plan view, partly in section, of the truck and brake arrangement shown in Fig. 1.

For illustrative purposes the invention is shown embodied in a railway vehicle truck of the type having a cast metal truck frame 1 and two longitudinally spaced wheel and axle assemblies 2 and 3, each of which assemblies comprises laterally spaced wheels 4 which may be secured in any desired manner to the axle 5 so as to rotate therewith.

Between the wheels and at each side of the truck each axle 5 is suitably journaled in a journal bearing 6 loosely mounted between spaced pedestal jaws 7 depending downwardly from the truck frame, and seated on the journal bearings, and resiliently supporting the truck frame are springs 8.

The truck frame is substantially the same construction as that shown in the aforementioned pending application and comprises side frames 9 which are inset or recessed opposite each wheel to accommodate the wheel and further comprises pedestal jaws and journal bearings disposed inboard of the wheels. The side frames 9 are spaced apart transversely of the truck and may be integrally connected together in the usual manner by transversely extending transoms 10 and transversely extending end pieces 11.

Located outboard of each wheel and axle assembly but adjacent thereto is an annular brake drum 12 which is secured to the outer end of the axle so as to rotate therewith. This drum is provided with an outer or peripheral braking surface which is adapted to be frictionally engaged by brake elements 13, 14 and 15, radially arranged about the drum, the greater portion of the elements 13 and 14 being located below the horizontal center line of the drum and opposite sides thereof and the element 15 being located above the drum and centered on substantially the vertical center line thereof. It will here be understood that each brake element may comprise the usual brake shoe and brake shoe head, but since this combination of head and shoe is well known the element will, for simplification, be hereinafter referred to by either the term brake shoe or brake shoes.

The brake shoes 15 are pivotally carried by a combined lever and brake rigging supporting member 16 which extends longitudinally of the truck on the outer side of the adjacent side frame 9 and above the brake drum, the brake shoes being arranged one on each side of the member and being operatively connected to the member by means of a transversely extending pin 17.

The inner end of the member 16 is pivotally connected to the adjacent truck side frame 9 by means of a transversely extending pin 18. The outer end of the member is made in the form of a circular seat 19 which is loosely mounted for vertical movement in a pocket 20 formed in one end of the truck frame. This seat 19 rests on a spring seat 21 carried by a spring 22 which is seated on the bottom wall 23 of the pocket 20. Extending through a central circular opening in the spring seat 21 and an aligned opening in the wall 23 is a bolt 24. This bolt is provided at its upper end with a head 25 which forms a stop for the spring seat to limit upward movement of the spring seat relative to the wall 23. Exteriorly of the pocket 20 there is screwed on the lower screw-threaded end of the bolt an adjusting nut 26 which, as will hereinafter more fully appear, is adapted to be engaged by the wall 23 to limit upward movement of the bolt. Also screw-threaded on this portion of the bolt is a check nut 27 which is adapted to lock the nut 26 in its proper adjusted position.

It will here be understood that the springs 22 are of considerably less value than the truck supporting springs 8 so that they may be compressed without compressing the springs 8. These springs 22 are, however, of such value that when the brakes are released they will support the member 16 and thereby the brake riggings in the positions in which these parts are shown in Fig. 1.

The head 25 of the bolt is square in cross section and extends through a correspondingly shaped opening in the seat 19, there being a slight operating clearance between the head and the seat.

Interposed between and operatively engaging the seat portion 19 of the member 16 and a cover plate 28 secured to the casing forming the pocket 20 is a spring 29 which is adapted to oppose undue upward movement of the member 16 relative to the truck frame when the brake rigging is in release position and the truck is subjected to the usual service shocks.

The outer end portion of the member 16 is recessed or arched on its lower side to clear the periphery of the brake drum 12 and to form downwardly depending legs 30 and 31 which are spaced apart longitudinally of the truck and arranged one on each side of the brake drum.

The brake shoes 13 at each end of each wheel and axle assembly are arranged one on each side of a vertically disposed brake cylinder lever 32 and are pivotally connected to the lower end of the lever by means of a transversely extending pin 33. The upper end of the lever is operatively connected to the outer end of the piston rod 34 of a brake cylinder device 35 which is secured to the outer side of the member 16. At a point located above the pin 33 the lever is pivotally mounted on a transversely extending pin 36 carried by the leg 30 of the member 16, which pin serves both as a fulcrum and a support for the lever and thereby for the brake shoes.

The brake shoes 14 at each end of each wheel and axle assembly are arranged one on each side of a vertically disposed brake cylinder lever 38 and are pivotally connected to the lower end of the lever by means of a transversely extending pin 39. The upper end of the lever is operatively connected to the outer end of the piston rod 40 of a brake cylinder 41 which is secured to the outer side of the member 16, preferably in longitudinal alignment with the brake cylinder 35. At a point located above the pin 39 the lever is pivotally mounted on a transversely extending pin 42 carried by the leg 31 of the member 16, which pin serves both as a fulcrum and a support for the lever.

The brake cylinders 35 and 41 are spaced apart longitudinally of the member 16 to accommodate the brake shoes 15.

The brake cylinder devices 35 and 41 have not been shown in detail, this being deemed unnecessary as they are of the conventional type having a cylinder casing in which there is operatively mounted the usual reciprocable piston. The pistons of these devices are responsive to the pressure of fluid supplied to the cylinder portions for actuating the piston rods 34 and 40 and thereby levers 32 and 38, respectively, to effect an application of the brakes and operated upon the venting of fluid from the cylinder portions to permit the usual brake cylinder release springs to move the brake cylinder pistons and thereby the levers and brake shoes to their normal release position. When the brake shoes 13 and 14 are being moved to their release positions the spring 22 acts to move the member 16 upwardly thereby moving the brake shoes 15 to their release position.

Fluid under pressure is either admitted to or released from each pair of brake cylinder devices by way of a pipe 50 and a flexible conduit 51 which leads to the supply and release pipe carried by the vehicle body and which in turn leads to the supply and release passage of a suitable brake controlling valve device, not shown.

*Application of the brakes*

When it is desired to effect an application of the brakes, fluid under pressure is admitted through conduit 51 and pipe 50 to the brake cylinders 35 and 41 at each end of each wheel and axle assembly.

In response to the pressure of fluid thus admitted, each pair of brake cylinder devices 35, 41, function to actuate the operatively connected levers 32 and 38, respectively, to move the respective brake shoes 13 and 14 into braking engagement with the peripheral braking surface of the adjacent brake drum 12. With the brake shoes 13 and 14 in such engagement, the increasing force being applied to the brake shoes through the operation of the brake cylinder devices causes the shoes to move downwardly along the peripheral surface of the brake drum. This movement is due to the location of the shoes below the horizontal center line of the brake drum and to the application of the braking force to the shoes in a direction substantially parallel to the horizontal center line of the drum. The downwardly directed force due to such action being transmitted through the levers to the member 16, causing the member to move downwardly about the pin 18 and against the opposing action of the spring 22 until such time as the brake shoes 15 engage the drum. At this time the downward movement of the member 16 and the several brake rigging parts carried thereby will stop since the member will now be rigidly supported by both the truck frame and the brake drum.

With the wheels 4 and brake drums 12 rotating in the direction indicated by the arrows in Fig. 1, the drag of the drums on the brake shoes 14 at the front end of the truck will cause a further downwardly directed pull to be applied to the levers 38 and thereby to the outer end of the associated member 16, thus augmenting the force applied to the brake shoes 15. The drag of the drum on the brake shoes 13 at this end of the truck has a tendency to move such shoes upwardly but this tendency is overbalanced by the downward force set up by the shoes as they tend to move downwardly along the braking surface of the drum under the influence of brake cylinder pressure applied to the lever 38.

It should here be mentioned that the force applied to the outer end of the member 16, through the medium of the lever 38 is the sum of the downwardly directed force produced by the action of the shoes 14 under the influence of the brake cylinder pressure and the force produced by the downward drag of the brake drum on the brake shoes 14, while the force applied to the member 16, through the medium of the lever 32 is that produced by the action of the shoes 13 under the influence of brake cylinder pressure minus the force due to the upward drag of the brake drum on the shoes 13. From this it will be apparent that the downward pull of the brake shoes 14 at the leading side of the brake drum will exceed the downward pull of the brake shoes 13 at the other side of the drum. At the other or rear end of the truck the downward pull of the brake shoes 13 and 14 on the member 16 is just the reverse of that of the shoes at the front end of the truck since the disposition of the shoes 13 and 14 with respect to the leading and other side of the brake drum is the reverse of that at the front end.

It will be noted that at the front end of the truck the greater pull of the brake shoes at the leading side of the brake drum is transmitted to the outer end of the member 16 while at the rear end of the truck the corresponding pull of the brake shoes at the leading side is applied to the member 16 intermediate its ends. As a result of this the brake shoes 15 at the front end of the truck will be applied with greater force to the brake drum than will the corresponding brake shoes at the rear end of the truck.

It will be evident that with the brakes applied the members 16 will tend to rotate with the wheel so that the member at the front end of the truck will exert an upward force on its pivot pin 18 and that the member at the rear end of the truck will exert a downward force on its pivot pin.

In the arrangement shown, the upwardly directed force transmitted to the truck frame through the medium of the member 16 at the front end of the truck slightly exceeds the downwardly directed force transmitted through the medium of the corresponding member 16 at the rear end of the truck, but the difference in the magnitude of these forces is so slight as to be negligible. If, however, it should be desired to have each of these forces balance the other, the only change in the present arrangement necessary to insure this result is to connect the inner ends of the members 16 at each side of the truck frame to the frame by a single pin arranged on the transverse center line of the truck in the same manner as shown in the aforementioned pending application.

It will thus be seen that with the brake rigging in application position, the brake shoes 15, besides serving to assist in supporting the member 16 and thereby the brake rigging, also act to resist rotary movement of the drum thus materially increasing the braking action on a wheel and axle assembly for any given brake applying force applied to the rigging.

When the vehicle is in motion and an application of the brakes is initiated, the momentum of the body of the vehicle has a tendency to tilt the truck forwardly with the result that the adhesion between the rear truck wheels and the track rails will be unintentionally decreased, so that these wheels will have a greater tendency to slide on the rails than will the front truck wheels.

With this in mind the brake arrangement disclosed in the drawings has been so designed that the total braking force of the three sets of brake shoes on the rear wheels of the truck, for a given brake cylinder pressure, will be less than that of the corresponding brake shoes on the front wheels, thereby lessening the tendency of the rear wheels to slide on the rails.

*Release of the brakes*

When it is desired to release the brakes, fluid under pressure is vented from the brake cylinder devices. When this is accomplished the usual release springs, not shown, in the brake cylinder devices cause the brake cylinder pistons and piston rods to move inwardly to their normal release position. This causes the brake levers and thereby the brake shoes 13 and 14 to assume their normal release positions as shown in Fig. 1. It will here be noted that as the brake shoes 13 and 14 move out of contact with the brake drum the springs 22 act to raise the outer end of the member 16, thereby moving the brake shoes 15 out of engagement with the drum, the upward movement of the members being limited by the engagement of the washer 21 with the heads 25 of the bolts and the engagement of the adjusting nuts 26 with the bottom wall of the pocket 20.

Modifications in the structure illustrated and described may be made without departing from the spirit of my invention, and I do not therefore wish to be limited otherwise than by the scope of the appended claims.

Having now described my invention, what I claim as new and desire to secure by Letters Patent, is:

1. The combination with a railway vehicle truck comprising a truck frame and a supporting wheel and axle assembly, of a brake shoe movable into braking engagement with said assembly, means including a brake cylinder device for actuating said shoe, and means movably connected to said truck frame adapted to support said shoe and the shoe actuating means and being movable into engagement with said assembly by the shoe actuating means acting under the influence of forces set up by the engagement of said shoe with the assembly.

2. The combination with a railway vehicle truck comprising a supporting wheel and axle assembly, of a brake shoe movable into braking engagement with said assembly, mechanism including a prime mover for actuating said shoe, and means supporting said mechanism and movable into engagement with said assembly in response to forces set up by the engagement of said shoe with the assembly.

3. The combination with a railway vehicle truck comprising a supporting wheel and axle assembly, of a brake shoe movable into braking engagement with said assembly, a lever for actuating said shoe, a prime mover for actuating said lever, and means supporting said shoe, prime mover and lever and movable into engagement with said assembly by said lever in response to forces set up by the engagement of said shoe with the assembly.

4. The combination with a railway vehicle truck comprising a supporting wheel and axle assembly, clasp arranged brake shoes movable into braking engagement with said assembly, two mechanisms operative separately from each other for actuating said shoes, each of said mechanisms including a prime mover, and means supporting said mechanisms and movable into engagement with said assembly in response to forces set up by the engagement of said shoes with the assembly.

5. The combination with a railway vehicle truck comprising a supporting wheel and axle assembly, of clasp arranged brake shoes movable into braking engagement with said assembly, two mechanisms operative separately from each other for actuating said shoes, each of said mechanisms including a prime mover, another brake shoe movable into engagement with said assembly, and means supporting said mechanism and operative in response to forces set by the engagement of said clasp arranged brake shoes with said assembly to move said other brake shoe into engagement with the assembly.

6. The combination with a railway vehicle truck comprising a supporting wheel and axle assembly, of clasp arranged brake shoes movable into braking engagement with said assembly, two mechanisms operative separately from each other for actuating said shoes, each of said mechanisms including a prime mover, another brake shoe movable into engagement with said assembly, and means supporting said other brake shoe and both of said mechanisms and operative in response to forces set up by the engagement of said clasp arranged brake shoes with said assembly to move said other brake shoe into engagement with the assembly.

7. The combination with a railway vehicle truck comprising a truck frame and a supporting wheel and axle assembly, of a brake shoe movable into braking engagement with said assembly, a lever for actuating said shoe, a prime mover for actuating said lever, and means movably connected to said truck frame adapted to support said lever and prime mover and being movable by said lever in response to the forces set up by the engagement of said shoe with the assembly into engagement with the assembly.

8. The combination with a railway vehicle truck comprising a truck frame and a supporting wheel and axle assembly, of a brake shoe movable into braking engagement with said assembly, a lever for actuating said shoe, a prime mover for actuating said lever, and means pivotally connected to said truck frame for vertical movement relative to the truck frame and adapted to support said lever and prime mover, said means being movable into engagement with said assembly by said lever in response to forces set up by the engagement of said shoe with the assembly.

9. The combination with a railway vehicle truck comprising a truck frame and a supporting wheel and axle assembly, of a brake shoe movable into braking engagement with said assembly, a brake carrier secured at one end to said frame for vertical rocking movement relative thereto, a downwardly depending leg adjacent the other end of said carrier, a lever pivotally supported intermediate its ends on said leg and operable to move said shoe into braking engagement with said assembly, and a brake cylinder on said carrier operable to actuate said lever, said carrier being rockable into engagement with said assembly under the influence of the force set up by the engagement of said shoe with the assembly.

10. The combination with a railway vehicle truck comprising a truck frame and a supporting wheel and axle assembly, of a brake shoe movable into braking engagement with said assembly, a brake carrier secured at one end to said frame for vertical rocking movement relative thereto, a downwardly depending leg adjacent the other end of said carrier, a vertically disposed lever pivotally connected at its lower end to said shoe and pivotally supported intermediate its ends on said leg, said lever being operable to move said shoe into braking engagement with said assembly, and a brake cylinder on said carrier connected to the upper end of said lever and operable to actuate the lever, said carrier being rockable into engagement with said assembly under the influence of the force set up by the engagement of said shoe with the assembly.

11. The combination with a railway vehicle truck comprising a truck frame and a supporting wheel and axle assembly, of a brake shoe movable into braking engagement with said assembly, a brake carrier secured at one end to said frame for vertical rocking movement relative thereto, a downwardly depending leg adjacent the other end of said carrier, a vertically disposed lever pivotally connected at its lower end to said shoe and pivotally supported intermediate its ends on said leg, said lever being operable to move said shoe into braking engagement with said assembly, a brake shoe for engagement with the assembly carried by said carrier, and located over the assembly centrally with respect to the vertical center line of the assembly and a brake cylinder device on said carrier operative to actuate said lever, said carrier being rockable by said lever under the influence of the force set up by the engagement the first mentioned brake shoe with the assembly to move the second mentioned brake shoe into engagement with the assembly.

12. The combination with a railway vehicle truck comprising a supporting wheel and axle assembly, of a brake shoe located below the horizontal center line of the assembly and movable into braking engagement with the assembly, a brake shoe located above and centrally of the assembly and movable into braking engagement with the assembly, a lever for actuating the first mentioned shoe, a prime mover for actuating said lever, and a carrier for the lever, prime mover and second mentioned brake shoe, said carrier being movable in response to the forces set up by the engagement of the first mentioned brake shoe with the assembly for moving the second mentioned brake shoe into engagement with the assembly.

13. The combination with a railway vehicle truck comprising a truck frame and a supporting wheel and axle assembly, of clasp arranged brake shoes movable into braking engagement with said assembly, a brake supporting member carried by said truck frame and extending over said assembly at an angle to the axis thereof, and being movable relative to the truck frame into supporting relationship with said assembly, a pair of spaced legs depending from said supporting member and straddling the axle of the assembly, a brake lever pivotally connected to the lower end of each of said legs and operative to actuate one of said brake shoes, and means carried by said supporting member for actuating said levers.

14. The combination with a railway vehicle truck comprising a truck frame and a supporting wheel and axle assembly, of clasp arranged brake shoes movable into braking engagement with said assembly, a brake supporting member carried by said truck frame and extending over said assembly at an angle to the axis thereof, and being movable relative to the truck frame into supporting relationship with said assembly, a pair of spaced legs depending from said supporting member and straddling the axle of the assembly, a brake lever pivotally connected to the lower end of each of said legs and operative to actuate one of said brake shoes, and means carried by said supporting member for actuating said levers, said brake supporting member being movable into supporting relationship with the assembly by said levers acting under the influence of forces set up by the engagement of said brake shoes with the assembly.

CARLTON D. STEWART.